United States Patent [19]

Brownfield

[11] 4,236,496
[45] Dec. 2, 1980

[54] ROTARY ENGINE

[76] Inventor: Louie A. Brownfield, 3690 Ridgeway Dr., Los Alamos, N. Mex. 87545

[21] Appl. No.: 927,477

[22] Filed: Jul. 24, 1978

[51] Int. Cl.³ .............................................. F02B 53/08
[52] U.S. Cl. ..................................... 123/212; 123/238
[58] Field of Search ................ 123/204, 212, 214, 238

[56] References Cited

U.S. PATENT DOCUMENTS

| | | | |
|---|---|---|---|
| 871,523 | 11/1907 | Pollock et al. | 123/212 |
| 1,242,826 | 10/1917 | Llewellyn | 123/238 |
| 2,062,753 | 12/1936 | Linn | 123/238 |
| 2,273,754 | 2/1942 | Hand | 123/238 |
| 3,550,565 | 12/1970 | Sanchez | 123/238 |

Primary Examiner—Michael Roczo
Attorney, Agent, or Firm—Paul D. Gaetjens

[57] ABSTRACT

The major components of this rotary engine are two equal sized rotary units, the housing containing them along with associated ignition and cooling systems. Each of the rotary units consists of a shaft, gear, two outer compressor wheels, and one center power wheel which has twice the axial thickness as the compressor wheel. All the wheels are cylindrical in shape with a lobe section comprising a 180° arc on the periphery of each wheel which forms an expanding and contracting volumetric chamber by means of leading and trailing lips. The lobes of the first rotary unit are situated 180° opposite the lobes of the second adjacent mating rotary unit, thus lobes can intermesh with its corresponding wheel.

8 Claims, 6 Drawing Figures

ROTARY ENGINE

BACKGROUND OF THE INVENTION

1. Field of the Invention

The basic properties of a piston engine consist of the cylinder head, chamber, piston, and crank shaft. This rotary engine has the same properties as the piston engine except the position of these elements differ. In the piston engine at the time of initial fuel combustion, the piston is in a near perpendicular alignment of its axis. A significant amount of the energy being generated by the fuel combustion is therefore lost in this straight, downward push against the axis. In the rotary engine the piston is always rotating about a central shaft and therefore the forces generated by the combusting fuel is acting tangentially to the radius of the piston (wheel), thus transferring a maximum amount of energy to the shaft—meaning more power from less fuel and less air contamination. Another advantage of the rotary engine is the simplicity of design over the piston engine in that there are no reciprocating parts, thus making for a smoother and quieter running engine and keeping maintenance at a minimum. Because of this simplicity there are less parts to the engine and thus production costs are significantly less.

Adapting the principle of the invention, that is, two mating wheels which intermesh within their respective housings, this engine could use steam, air or pressurized fluids as a power source rather than combustible fuels. In addition this concept could be adopted to be used as a compressor or a vacuum pump.

2. The Prior Art

U.S. Pat. No. 3,550,565 describes an internal combustion engine in which three rotary members cooperate to form a compressor for the purpose of compressing a combustible air-fuel mixture. Carburetors communicate with the housing of the three rotary members and the compressed mixture is passed to a duplicate set of three rotary members which act as a motor. The rotary engine of this invention has two rotary units, and each unit has two compressor wheels which feed fuel to both sides of the power wheel. The design of each rotary unit is identical; but each wheel has a lobe on its outer periphery which forms a 180° arc. These lobes are offset by 180° in respect to the adjacent rotary unit. The lobes having leading and trailing lips form an expanding and contracting compression and combustion chambers.

SUMMARY OF THE INVENTION

The major components of the rotary engine of this invention are the two rotary units, the housing containing them, and the associated ignition and cooling systems. Each rotary unit is composed of one straight shaft, one gear, two bearings, and three wheels, the outer two wheels being the compressor and the center wheel being the power wheel. All the wheels are cylindrical in shape and have a lobe comprising a 180° arc of the circumference of the wheel with the end surfaces of each lobe forming a leading and trailing lip. On each rotary unit the gear and the wheels are affixed to a shaft in such a manner that the lobes on the outer wheels are 180° opposite that of the lobe on the center wheel, and the lobes of the first rotary unit being 180° out of phase with the lobes on the second rotary unit. The compressor wheels intake and compress the fuel-air mixture and also act as counterweights for the center, power wheel. The power wheel is equal in axial thickness to the two compressor wheels, reacts to the combusting fuels, and exhausts the expended gases while transferring energy to the shaft. Two gears, one on each shaft, intermesh with each other, thus maintaining equal velocity, acceleration, and transfer power between the rotary units.

DESCRIPTION OF THE PREFERRED EMBODIMENT

Figure 1:
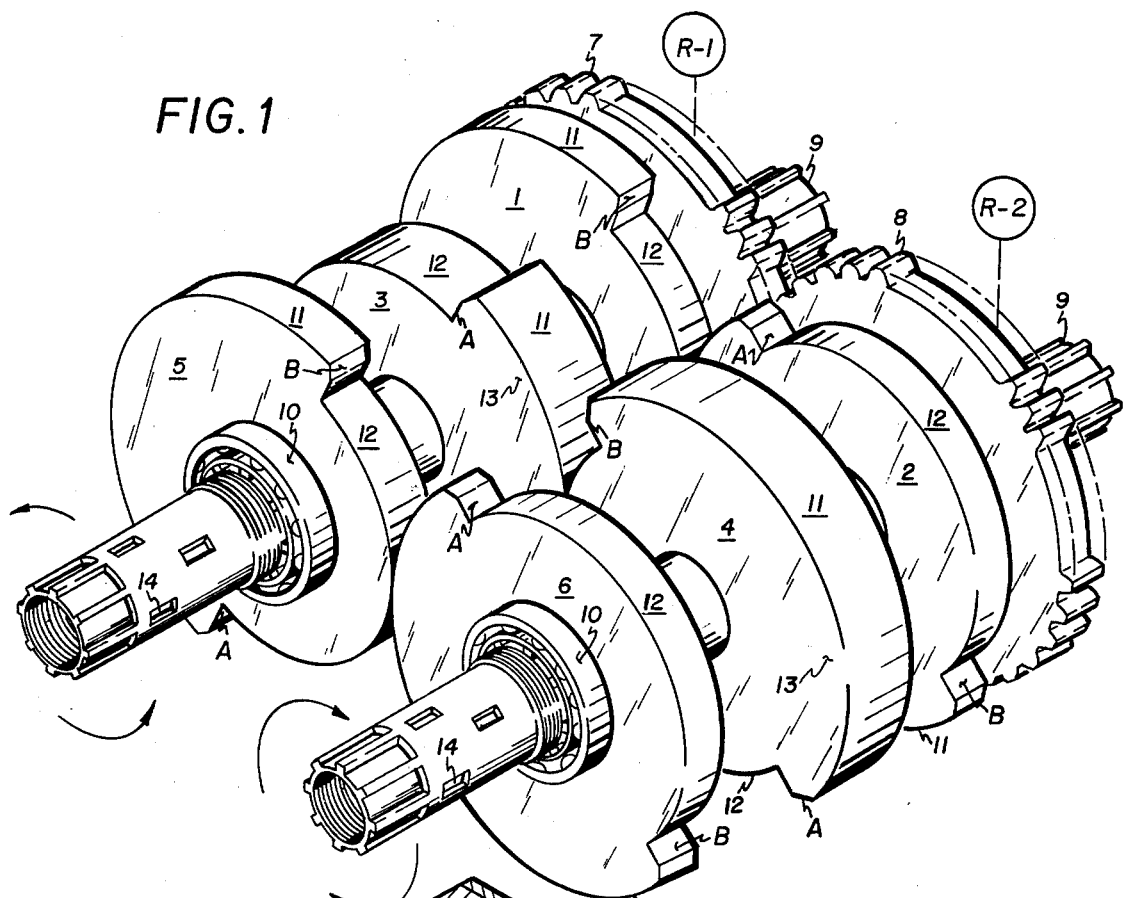
FIG. 1 is a perspective view of the two rotary units of this invention.

As shown in FIG. 1, the rotary engine of this invention comprises two identical rotary units R1 and R2, each unit having a straight shaft with coolant inlets and outlets 14, one gear, and three wheels. All the wheels 1, 2, 3, 4, 5, 6, are cylindrical in shape and have a lobe 11 which comprises a 180° arc of the wheels' circumference with the end surfaces of each lobe forming two lips, A and B. On rotary unit R1 the gear 7 and wheels 1, 3, 5 are affixed to the shaft 9 in such a manner that the lobes 11 on wheels 1 and 5 are 180° opposite the lobe on the center wheel 3. Similarly, on rotary unit R2 the lobes of wheels 2 and 6 are 180° opposite of the lobe on the center wheel 4. The inner radius 12 allows the lobes to mesh with their corresponding mate wheels. The outer wheels 1, 5, 2, 6 are the compressor wheels. Their function is to intake a fuel-air mixture, compress it, and to serve as counterweights for the center wheels 3 or 4. The center wheels 3 or 4 are the power wheels and have double the axial thickness of the compressor wheel. Their function is to react to the combusting fuels and exhaust the expended gases. The gears 7 and 8 mesh in a 1:1 ratio, thereby maintaining equal velocity and acceleration between the two rotary units R1 and R2. The gears 7 and 8 cause power to be transferred from one rotary unit to the other. The bearings 10 are situated on the two shafts 9 to reduce the friction of the rotary units R1 and R2 and to maintain their position in the housing.

Figure 2:
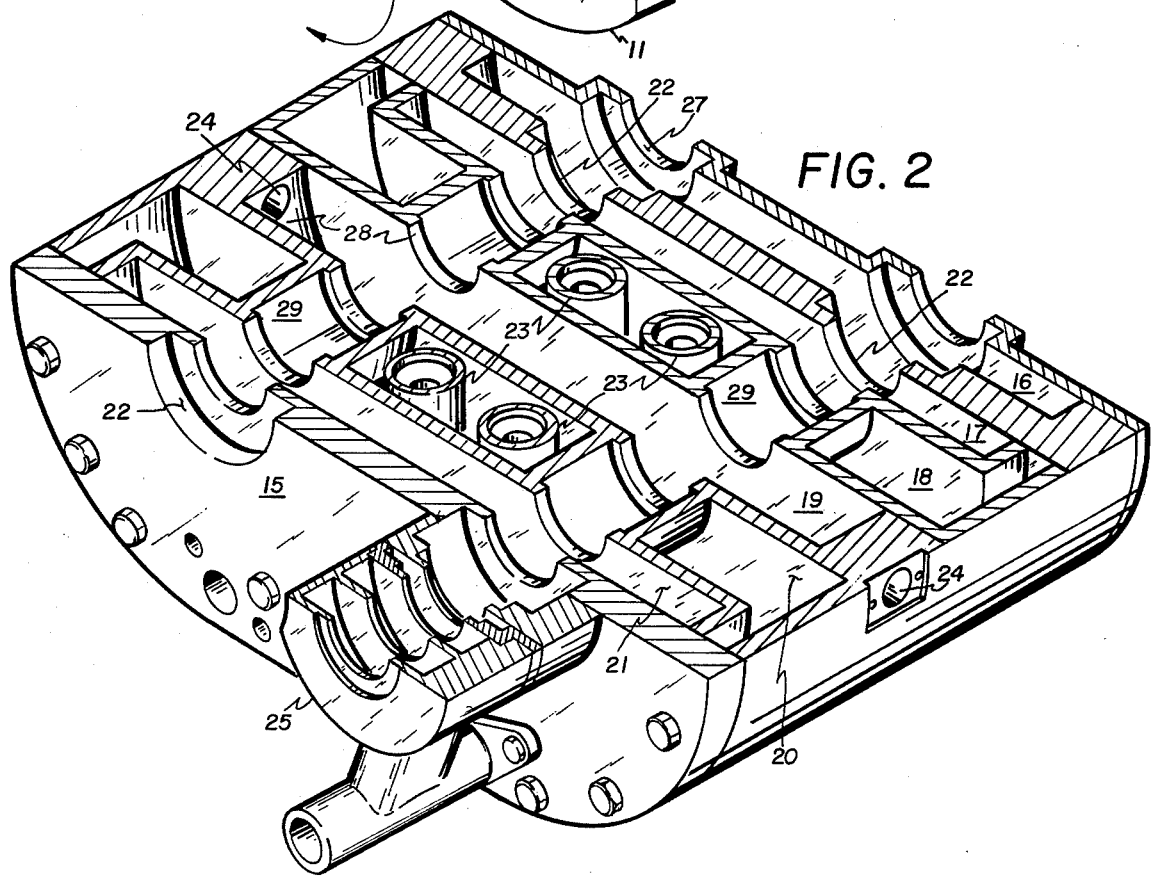
FIG. 2 is a partial cross-sectional view of the lower portion of the engine housing that contains the rotary units of FIG. 1 along with the associated fuel and cooling systems.

FIG. 2 shows a lower portion of the engine housing which surrounds the wheels. The housing has ducts, ports, and chambers for circulating the compressed fuel mixture, liquid coolant, and combustion products. It also contains the check valves and spark plugs. The housing 15 is divided into six compartments 16, 17, 18, 19, 20, 21. Compartment 16 holds both gears 7 and 8. Compartments 18 and 20 contain the check valves, compression passages, combustion chambers, and the main coolant channel. Compartments 17, 19 and 21 enclose the wheels of the rotary units R1 and R2. The recesses 22 are for the positioning of the bearings 10. A lower portion of the valve and combustion chambers 23, the two exhaust pressure relief ports 24, the assembly 25, coolant passage and the housing for the fuel pump mechanism are all clearly illustrated in FIG. 5. Recesses 27 holds the oil seals to the gear compartment while inner radii 28 of the housing surround the wheel and form part of the combustion chamber. Radial webs 29 isolate the shaft 9, from contact with the liquid coolant.

Figure 3:
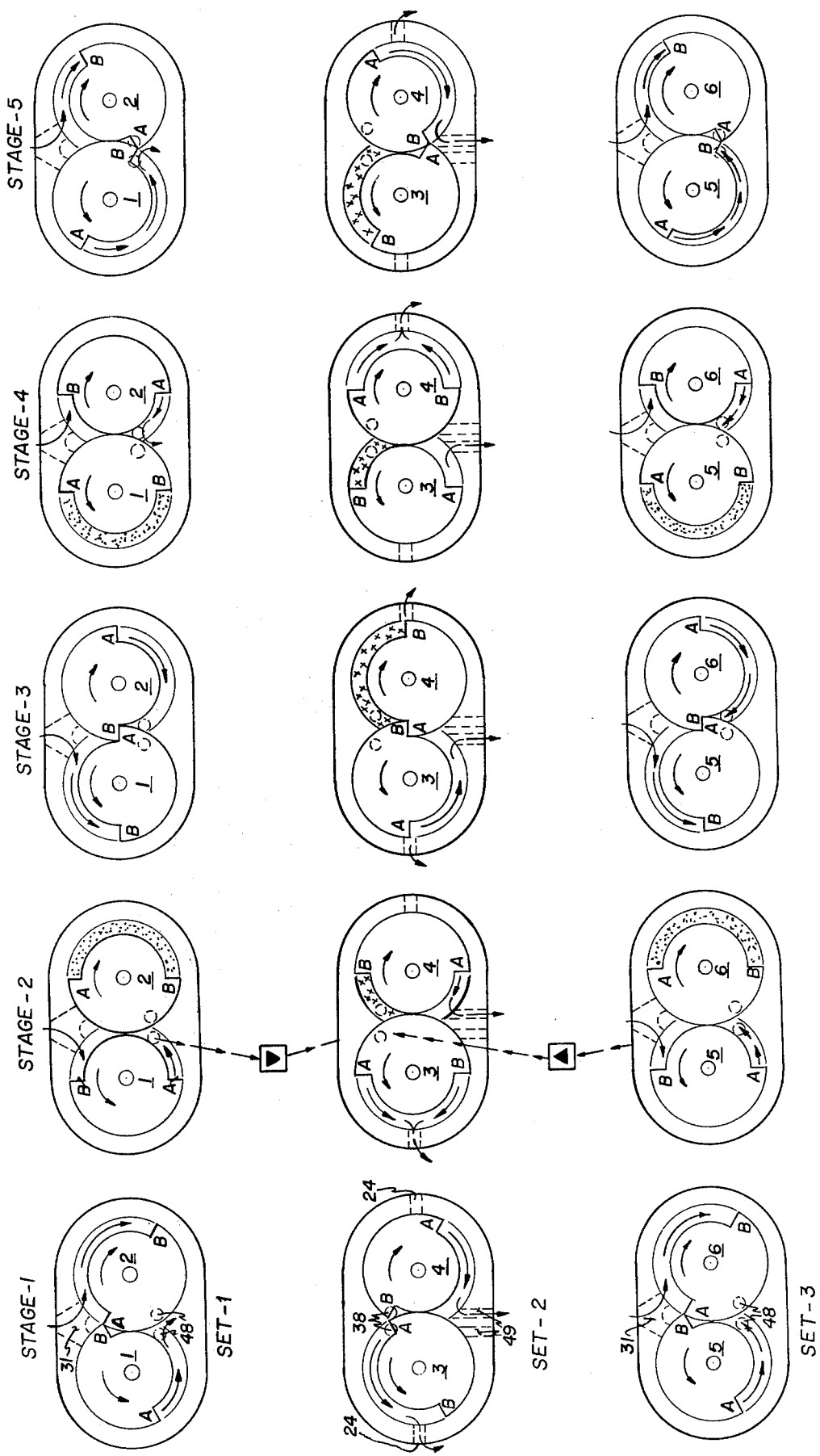
FIG. 3 is a schematic view of the operation of the two rotary units during one revolution, said operation being depicted in five distinct stages.

In FIG. 3, Set 1 shows the action of compressor wheels 1 and 2, Set 2 the action of power wheels 3 and 4, and Set 3 the action of compressor wheels 5 and 6 during one complete revolution of the engine of this invention which has been divided into five distinct stages.

STAGE 1

Set 2 shows power wheel 4 has initiated its turn at lip B. Lip A is pushing exhaust gases out of the exhaust port 49. Wheel 3 has just completed a power turn and the pressure gas remaining is being released through exhaust pressure relief port 24. Set 1 shows compressor wheel 2 is taking in fuel mixture and is nearly fully charged. Mate wheel 1 has begun to compress fuel mixture through its compression port 48 and check valve into the combustion chamber on the side of wheel 3. Set 3 has the same activity as Set 1 but feeds the opposite side of power wheels 3 and 4.

STAGE 2

Set 2 shows power wheel 4 has completed approximately one-half of its turn. Wheel 3 is still releasing exhaust gas pressure. Set 1 shows wheel 2 has become fully charged with a fuel mixture and is carrying the mixture between lips A and B toward the compression port 48 at the bottom of the chamber. Wheel 1 is taking in fuel mixture at lip B, and lip A is compressing fuel mixture into its respective chamber. Set 3 has the same activity as Set 1 but on the opposite side of power wheels 3 and 4.

STAGE 3

Set 2 now shows wheel 4 completed its power turn and is beginning to relieve the remaining gas pressure out through the exhaust relief port 24. Wheel 3 has begun pushing the remaining exhaust gases out exhaust port 49. Lip B of wheel 3 is approaching its position for an initial power turn. Set 1 shows wheel 2 has begun compression of fuel into its respective chamber. Wheel 1 has nearly completed taking in fuel. Set 3 has the same activity of Set 1 but on the opposite side of power wheels 3 and 4.

STAGE 4

Set 2 depicts wheel 4 relieving gas pressure out its exhaust pressure relief port 24. Wheel 3 has completed nearly one-half of its power turn and lip A is forcing exhaust gases out exhaust port 49. Set 1 shows wheel 2 is taking in fuel at lip B and is compressing fuel at lip A. Wheel 1 has its chamber fully charged with fuel mixture and is carrying this mixture between lips A and B to the compression port 48 at the bottom of the chamber. Set 3 has the same activity as Set 1 except on the opposite side of power wheels 3 and 4.

STAGE 5

Set 2 shows wheel 4 has begun to exhaust its remaining gases while wheel 3 is approaching the end of its power turn. Set 1 shows wheel 2 is taking in fuel mixture while wheel 1 is initiating its compression turn. Set 3 has the same activity as Set 1 except on the opposite side of wheels 3 and 4.

Figure 4:
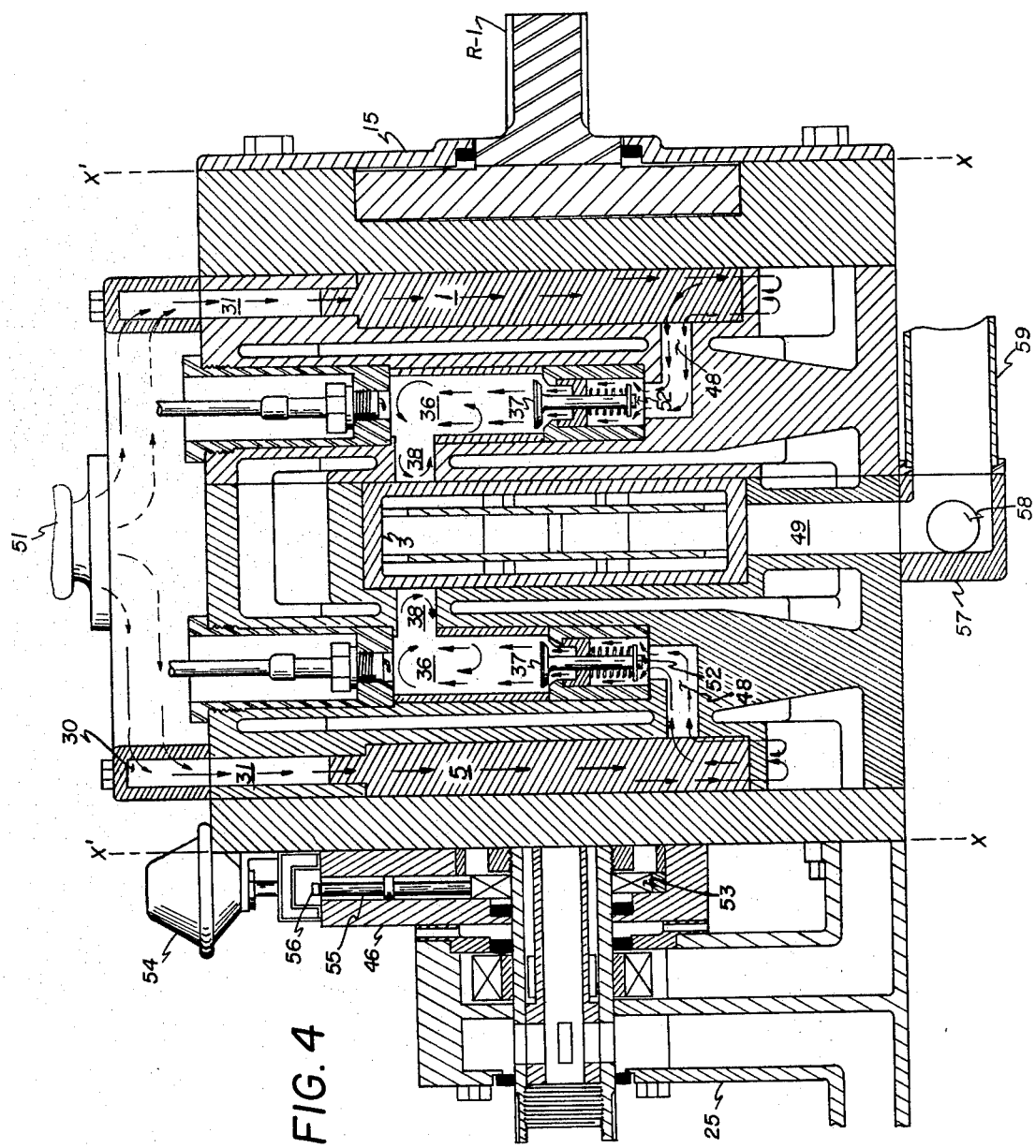
FIG. 4 is a cross-sectional view of the rotary engine taken at the valves along plane X—X' and shows the fuel system of one rotary unit.

FIG. 4 is a cross-sectional view taken at the two valves that supply fuel mixture to rotary unit R1. At each end of the housing at plane X—X', FIG. 4 recedes to the shaft area of rotary unit R1 and shows the ignition system for the engine. The wheels illustrated here are the two compressor wheels 1 and 5 and the power wheel 3 of rotary unit R1. The activity of the fuel mixture in the compression wheel 1 is the same as the activity in compressor wheel 5, and having this activity occurring simultaneously enables the lobe of the power wheel 3 to have equal pressure on both of its sides at the same time. As indicated by arrows, the air-fuel mixture from the carburetor 51 enters the intake manifold 30. This manifold is a U-shaped rectangular duct, used for the delivery of fuel mixture to the two intake ports 31. In FIG. 3 the ports 31 are shown to be fully open at the top and divided at the bottom by a web formed in the housing. This web divides the port into two separated channels. Each of these separated channels conducts the fuel into its respective wheel chamber. The openings at the bottom of these separated channels are opened and closed off by the outer radial surface of the lobes of their respective compressor wheel. The channel opening into the chamber of wheel 1 is closed off by the outer radial surface of the lobe on wheel 1, while the channel opening into the chamber of wheel 2 is open and allows fuel mixture to enter its volumetric chamber. This action alternates as the wheels turn, so that the channel to wheel 2 is closed off by its outer lobe surface when the channel to wheel 1 becomes open. As shown by the arrows in FIG. 4 the fuel mixture has now entered the compression wheel chambers and the mixture will be compressed. The fuel mixture is compressed into the ducts 48 which enter an opening at the side of the compression wheel chambers while the exit opens into the check valve chambers 52. The compressing fuel mixture passes through these ducts into the check valve chamber. The increasing pressure created by the compressor wheels overcomes the spring tension on the check valves 37 and pushes the valve open. This allows the compressing fuel mixture to enter the cylindrically shaped combustion chamber 36. The compressing fuel is now held back from further movement by the side 13 (see FIG. 1) of the lobes of the power wheel which covers the opening of the combustion port 38. As the compressor wheels turn, the pressure of the fuel mixture in the combustion chambers increases. When the compressor wheels have completed their compression turn, the increasing flow of pressure ceases allowing the pressurized fuel mixture in the combustion chamber to push on the top surface of the check valve. With the aid of the spring the valve is closed, thus retaining the pressurized fuel mixture within the combustion chamber. Lip B of the power wheel 3 now has approximately 20° more of turn before it begins to clear the orifice of the combustion port 38. The compressed fuel mixture retained in the combustion chamber may be ignited by the spark plug at any time during this 20° of turn. The engine has four such valve-combustion systems with only two being shown here. There is a valve-combustion system on each side of each power wheel. There are four openings formed in the housing, and each are cylindrical in shape and extend from the top surface of the housing to a short distance above the compression port. Inserted into these openings is the removable valve assembly. This assembly consists of a cylindrical shaped shell with the top end extending inward to form a seat for the valve. The interior of the shell has a cylindrical shaped removable core. It has a hole of sufficient size to allow the stem of the valve to pass through its center. Extending outward from this core are four "ears" spaced radially at 90°. The "ears" extend to the inner radial surface of the shell. This core is the valve guide. The 90° spacing between the "ears" allows the compressing fuel mixture to pass through the core to the combustion chamber. Below the core is a compression spring that extends to the bottom of the valve stem. The spring is held in place by a washer and a key through the valve stem and keeps the valve closed. The removable spark plug cage is a cylindrical shaped shell with the bottom end being closed. This closed end is ported and threaded for the positioning of the spark plug. The outer radial surface near the top end of the shell is threaded for fastening the shell into the housing. Extending between the spark plug cage and the valve assembly is a removable, cylindrical shaped tube. This is the combustion chamber liner. It has a cylindrical shaped opening near the top end that is in alignment with the combustion port 38. The purpose of this liner is to maintain the position of the valve assembly. The ignition and timing system is located at the forward end of the housing 46 and is activated only by the shaft of rotary unit R1. A cylindrical shaped disk 53 is affixed to the shaft. This disk has two small lobes on its outer radial surface of sufficient rise to open and close the breaker points. These two lobes are spaced radially 180° opposite each other. Each lobe breaks the points for its respective rotary unit.

The first lobe breaks the points for unit R1 and the second lobe breaks the points for R2. Proper ignition timing is accomplished by a movable plunger (not shown) that extends from the lobed disk to the breaker points. The radial movement of the plunger backward or forward, relative to the disk, will change the timing. This activity is automatically accomplished by the conventional vacuum activator 54. A portion of this plunger 55 is shown pushing the breaker points 56. The cylindrical shaped opening formed in the housing is the exhaust port 49. This port conducts the remaining exhaust gases to the exhaust manifold 57. The cylindrical opening 58 in the manifold is for the acceptance of a tube (not shown) that extends from the exhaust pressure relief port to this manifold. The exhaust pipe 59 extends from the manifold to the rear of the engine.

Figure 5:
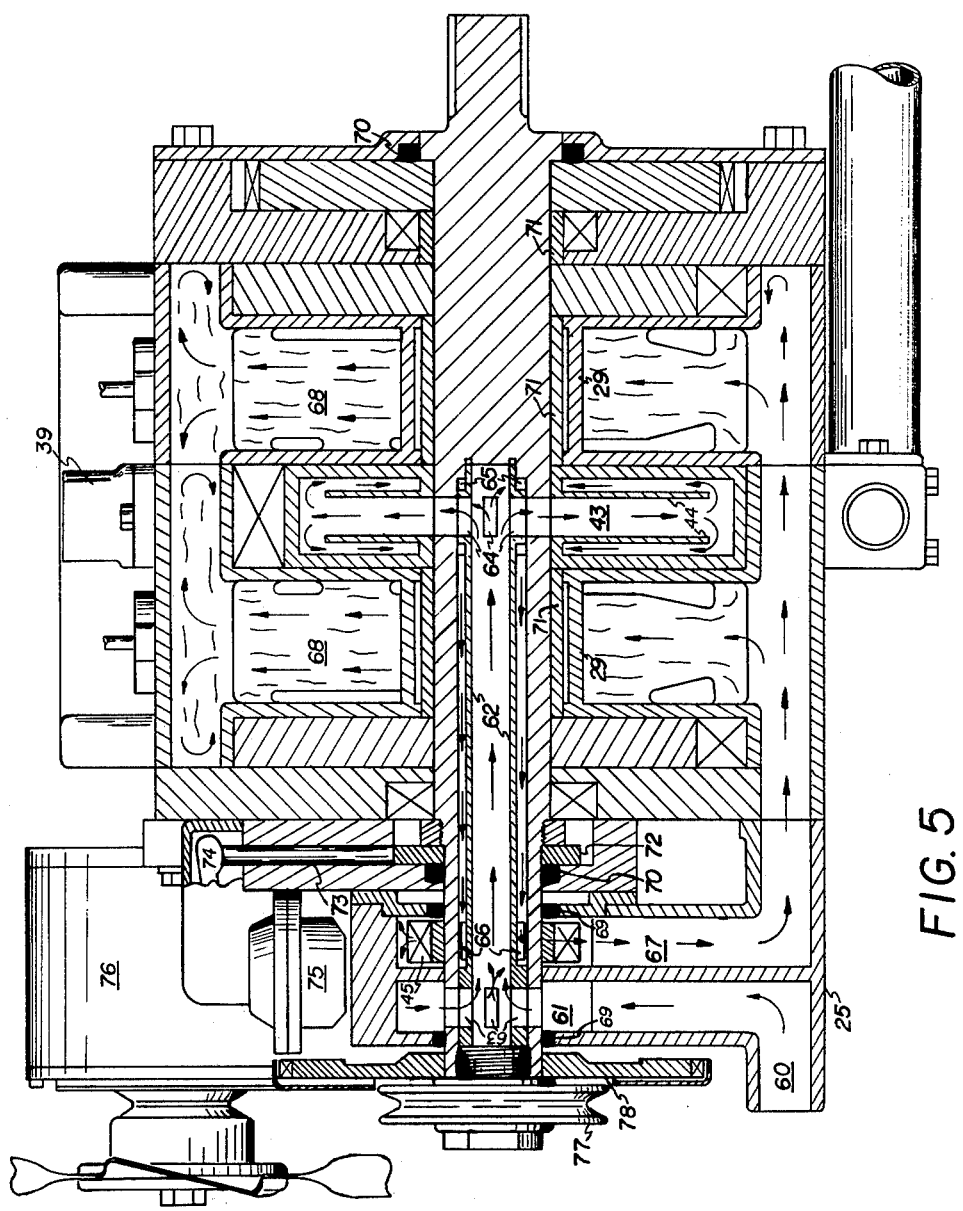
FIG. 5 is a cross-sectional view of one rotary unit and illustrates the liquid coolant system of said unit.

FIG. 5 is a cross-sectional view taken at the shaft of rotary unit R2. This figure illustrates the flow of liquid coolant within the area of rotary unit R2; the activity shown here, is identical to that of rotary unit R1. The liquid coolant enters the engine through a cylindrical shaped duct 60 formed in the removable assembly 25. The coolant is conducted through duct 60 to a cylindrical shaped cavity 61 that surrounds the shaft. Formed in the shaft is a cylindrical shaped opening extending from the forward end of the shaft to just beyond the location of the power wheel. Inserted into this opening is a cylindrical shaped removable tube 62 whose outer diameter is considerably smaller than the diameter of the opening in the shaft. This space between the outer radial surface of the tube and the inner radial surface of the shaft is a duct for the flow of coolant. At the forward end of the tube the outer diameter is enlarged to contact the inner surface of the shaft. This enlarged portion of the tube allows rectangular ports 63 to be formed for conducting the coolant from the cavity 61 into the interior of the tube 62. The coolant proceeds through the interior of the tube to rectangular ports 64 that are similar to 63. The outer diameter of the tube is again enlarged in this area to contact the inner radius of the shaft. This allows the ports 64 to extend from the interior of the tube to the cavity in the power wheel 43. The coolant is directed to the outer radius of the cavity by the two plates 44 formed in the interior cavity of the power wheel. The coolant proceeds around these plates and back into the shaft area and enters the shaft through ports 65. These ports extend from the cavity of the power wheel to the inner opening of the shaft. The coolant then proceeds through the space between the outer surface of the tube and the inner surface of the shaft to ports 66. These ports are also rectangular and extend from the inner radius of the shaft through the hub of the water pump impeller 45. This impeller is affixed to the shaft and moves the coolant throughout the engine. Proceeding from the water pump through a cylindrical shaped port 67, coolant enters the housing. From here the coolant flows at random and surrounds the valve-combustion chambers 68. The webs 29 are formed in the housing and isolate the shaft from the coolant. After flowing at random throughout the housing containing both rotary units, the coolant exits through outlet 39. Ports 64 and 65 are spaced radially at 90° angles, and some of the tube material is removed between the 90° spaces to allow coolant from the rear ports 65 to flow around the ports 64 and continue on up the shaft. Seals 69 are for the water pump and coolant cavity while oil seals 70 are for the bearing and gear compartment. The cylindrical shaped spacer collars 71 are to assure proper spacing between the components of the rotary units. The fuel pump mechanism is operated from this shaft of unit R2 only. A cylindrical shaped disk 72 is affixed to the shaft. This disk has the center bore offset to allow the disk to rotate in an eccentric motion. This eccentric movement pushes a plunger 73 up and down. This plunger extends from the outer radial surface of the disk to the actuating arm of the fuel pump 74. The fuel pump 75 is of the conventional mechanical type. A conventional type alternator 76 is used with a cooling fan and a pulley 77 operates the alternator. Gear 78 meshes with a starter motor (not shown).

Figure 6:
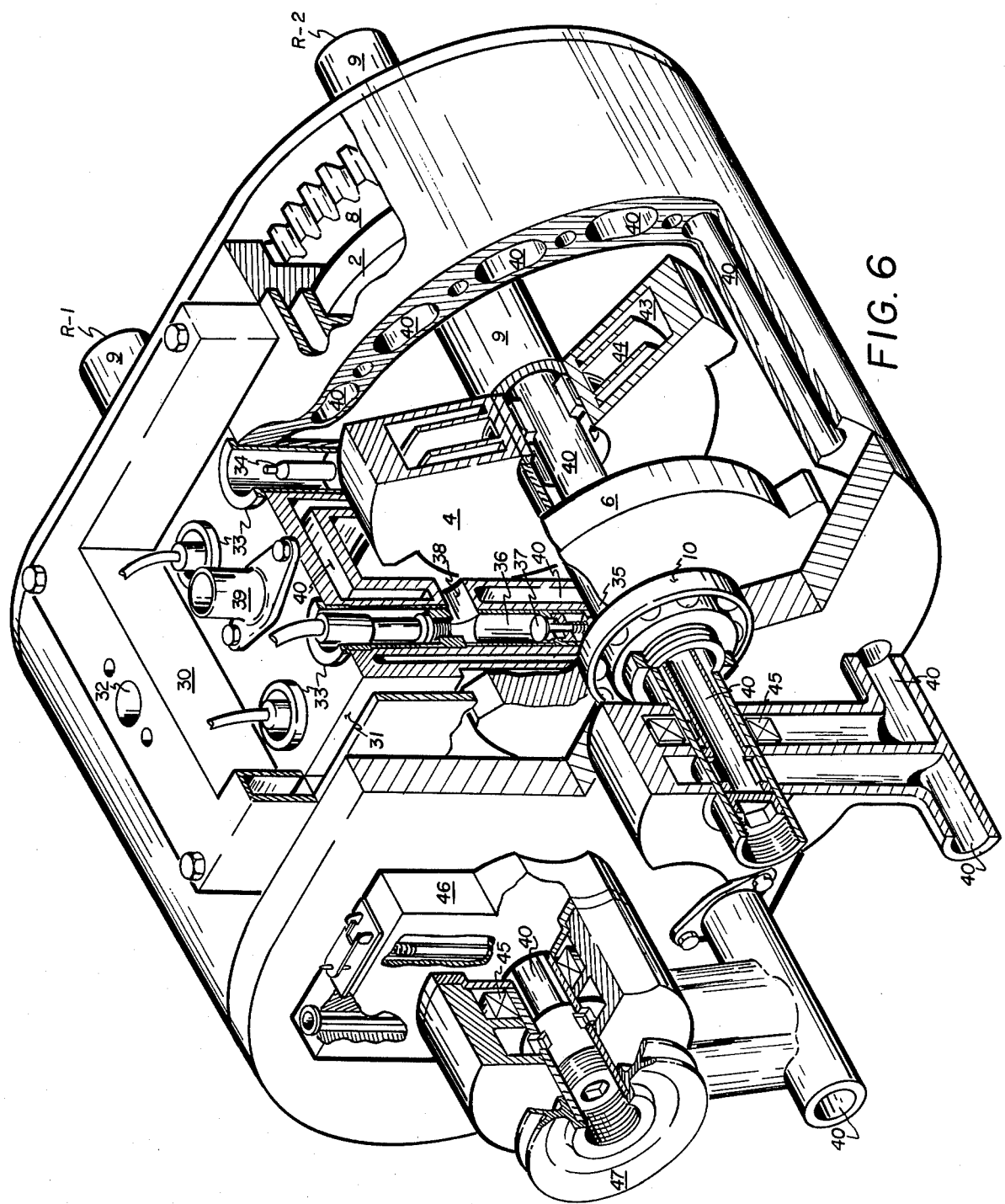
FIG. 6 is a perspective view of the entire rotary engine with one rotary unit shown in partial cross section.

FIG. 6 is a perspective view of the rotary engine with parts of rotary unit R2 shown in cross section. Listed here are the major components of the engine that have been described heretofore and shown in FIGS. 1 through 5: intake manifold 30 for channeling the air fuel mixture to the intake ports 31, inlet opening 32 and mounting bolt holes for the carburetor, removable cages 33 containing the spark plugs 34, valve assembly 35 and combustion chamber liners 36, check valve 37 that retains pressure in its combustion chamber 36, combustion port 38 from the combustion chamber 36 to the power wheel 4, liquid coolant outlet 39 and channels 40 for the conducting of liquid coolant throughout the engine, interior cavities 43 of the power wheels for the liquid coolant, plates 44 to direct the flow of the coolant inside the cavity of the power wheel, water pumps 45 that flow the liquid coolant, main shafts 9, of the two rotary units, two compressor wheels 2, 6 of the rotary unit R-2, the power wheel 4 of rotary unit R-2, gear 8 of rotary unit R-2, housing 46 containing the cam and timing regulating mechanism of the ignition system, one of the four bearings 10 sustaining the rotary units, and pully 47 for the operation of any auxiliary unit that may be attached to the engine.

To assure maximum efficiency of this engine, emphasis on a close relationship between the components of units -R1- and -R2- and their relationship to the housing must be maintained. Only a minimum of clearances should be allowed to assure the freedom of the two rotary units to rotate. By achieving this close relationship between the components it is unnecessary for the use of positive sealing. Sealing creates friction drag and requires lubrication. The benefits achieved from positive sealing would be overcome by the friction drag they would create. The gases that escape without sealing are minimal, and the efficiency loss, only negligible.

OPERATION OF THE ENGINE

The operation of the two rotary units R1 and R2 during one revolution of the engine is described. (Also see FIG. 3) Each wheel has a lobe comprising 180° of its circumference with the end surfaces of each lobe forming two lips A and B (see FIG. 1). Lip A is the leading lip and B the trailing lip. These lips act as the "pistons" of the rotary engine. As the rotary units R1 and R2 turn the lobes on the wheels intermesh with the inner radial surfaces of their opposite mate wheels respectively, and create expanding and contracting volumetric chambers. As lip B on one wheel is turning away from its mate, an expanding chamber is being created thereby drawing in a fuel mixture. When the chamber is fully charged the fuel is carried between lips A and B and will be compressed as lip A of the wheel turns toward its mate wheel. The power wheels have the same movement characteristics as the compressor wheels. Lip B of the power wheels is the lip that reacts to the pressures of the combusting fuel, while lip A is the lip that sweeps expended gases out the exhaust ports. The exhaust pressure relief port performs its functions once lip B clears its orifice. The side surfaces of the lobes of the power wheels are used to close off the combustion ports. This closing action permits compression buildup in the combustion chamber from the compressor wheels. When the side surfaces of the lobes at lip B of the power wheels clears the orifice of the combustion port the compressed fuel-air mixture in the combustion chambers is ignited by the spark plugs. The pressure from this combusting fuel enters the expanding chamber. This expanding chamber is created by the movement of lip B of the wheel turning away from its mate wheel. The pressure of the combusting fuel pressing on the surface of lip B pushes the lip radially toward the exhaust relief port thereby generating the power turn of the cycle. After lip B has cleared the exhaust pressure relief port, the remaining gas pressure is released through this port. Lip A then sweeps out any remaining expended gases through the exhaust ports at the bottom of the housing.

The foregoing examples are not intended in any way to limit the scope of the invention but rather are presented for the purpose of meeting the enablement and best mode requirements of 35 U.S.C. 112. The scope of the invention is as set forth in the Summary of the Invention and the broad claims appended hereto.

I claim:

1. A rotary internal combustion engine comprising, in combination, first and second identical, parallel and adjacent rotary units contained within a housing, each unit cooperating with the said housing and with the rotors to form individual variable volume intake-compressor wheel and power wheel chambers, each rotary unit having a shaft on which is mounted two bearings and three wheels, the outer two wheels acting as an air-fuel intake-compressor and a center power wheel, all of said wheels being of cylindrical shape and each having a lobe comprising an 180° arc of the circumference of the wheel thereby forming a leading and trailing lip, said lobes of the outer wheels being situated 180° opposite the lobe on its center wheel, the lobes of the first rotary unit being 180° opposite the lobes of the second rotary unit, and (a) means for feeding an air-fuel mixture to the said intake-compressor wheel chambers, (b) means for transferring the compressed air-fuel mixture from the intake-compressor wheel chambers to combustion chambers located on each side of the center power wheel chamber, (c) means for igniting the compressed air-fuel mixture contained in the combustion chambers, (d) means for transferring energy of the ignited fuel mixture from the combustion chamber to the center power wheel chamber, (e) means for exhausting the expended gases from the center power wheel chamber, (f) means for intermeshing lobes of the rotary units in a predetermined relationship to each other allowing each of the said units to rotate and provide mechanical energy, and (g) means for liquid cooling the engine.

2. The engine of claim 1 in which the means for feeding an air-fuel mixture to the said intake-compressor chambers comprise a carburetor, an intake manifold duct from a carburetor to intake ports, all in communication with each of the said intake-compressor wheel chambers, and said intake ports being opened and closed by the outer radial surface of a lobe of each compressor wheel.

3. The engine of claim 1 in which the means for transferring the compressed fuel mixture from the intake-compressor wheel chambers to the combustion chambers comprises a duct at the side of the intake-compressor wheel chamber, a spring-loaded check valve located within the combustion chamber, and all in communication with the combustion ports contained in the housing at the side of the center power wheel chamber.

4. The engine of claim 1 in which the means for igniting the compressed air-fuel mixture contained in the combustion chambers comprises a spark plug and timing system which is activated by the rotating shaft of one rotary unit.

5. The engine of claim 1 in which the means for conveying the ignited fuel mixture to the center power wheel chamber comprises a duct allowing communication between the combustion chamber and the center power wheel chamber, said duct being opened and closed by the side surface of the lobe of the center power wheel.

6. The engine of claim 1 in which the means for exhausting the expended fuel mixture comprises an exhaust pressure relief port, and an exhaust port located within the cylindrical surface area of the center power wheel chamber which is in communication with an exhaust manifold, and said ports being opened and closed by the outer radial surface of a lobe of the center power wheel.

7. The engine of claim 1 in which said means for intermeshing the lobes of the rotary units consists of a gear mounted on each of the said shafts of the rotary unit, said gears meshing in a 1:1 ratio thereby maintaining equal velocity and acceleration between the rotary units.

8. The engine of claim 1 in which the means for liquid cooling the center power wheel comprises an annulus formed in the said shaft of each rotary unit with inlet and outlet ports to allow fluid flow into and out of a cavity within the center power wheel, and a pump to circulate the said liquid coolant throughout the shaft and cooling cavities formed in the housing.

* * * * *